(12) United States Patent
Goyal et al.

(10) Patent No.: US 12,531,806 B2
(45) Date of Patent: Jan. 20, 2026

(54) NETWORK INTERFACE DEVICE WITH FLOW CONTROL CAPABILITY

(71) Applicant: Intel Corporation, Santa Clara, CA (US)

(72) Inventors: Prateesh Goyal, Cambridge, MA (US); Georgios Nikolaidis, Menlo Park, CA (US); Junggun Lee, Los Altos, CA (US); Jeremias Blendin, Santa Cruz, CA (US); Yi Li, Fremont, CA (US)

(73) Assignee: Intel Corporation, Santa Clara, CA (US)

( * ) Notice: Subject to any disclaimer, the term of this patent is extended or adjusted under 35 U.S.C. 154(b) by 421 days.

(21) Appl. No.: 17/475,203

(22) Filed: Sep. 14, 2021

(65) Prior Publication Data

US 2022/0078119 A1     Mar. 10, 2022

Related U.S. Application Data

(60) Provisional application No. 63/127,105, filed on Dec. 17, 2020.

(51) Int. Cl.
  *H04L 12/803*     (2013.01)
  *H04L 47/122*     (2022.01)

(52) U.S. Cl.
  CPC ................. *H04L 47/122* (2013.01)

(58) Field of Classification Search
  CPC .................................................. H04L 47/122
  USPC ........................................................ 370/237
  See application file for complete search history.

(56) References Cited

U.S. PATENT DOCUMENTS

| | | | |
|---|---|---|---|
| 9,276,832 B2 | 3/2016 | Shihada et al. | |
| 2001/0043565 A1* | 11/2001 | Chen | H04L 47/32 370/445 |
| 2009/0232001 A1* | 9/2009 | Gong | H04L 47/10 370/236 |
| 2010/0177637 A1 | 7/2010 | Kadambi et al. | |
| 2012/0087245 A1* | 4/2012 | Leung | H04W 8/04 370/236 |

(Continued)

FOREIGN PATENT DOCUMENTS

| | | |
|---|---|---|
| KR | 1020120024781 A | 3/2012 |
| KR | 1020150036418 A | 4/2015 |

OTHER PUBLICATIONS

International Search Report and Written Opinion for PCT Patent Application No. PCT/US21/52079, Mailed Jan. 17, 2022, 11 pages.

(Continued)

*Primary Examiner* — Christopher M Crutchfield
*Assistant Examiner* — Jean F Voltaire
(74) *Attorney, Agent, or Firm* — Compass IP Law PC (57) ABSTRACT

Examples described herein relate to a network interface device that includes data plane circuitry, when operational, to: identify a flow of packets that is a cause of queue congestion and cause transmission, to an upstream network interface device, of a packet with an identifier of a source queue in the upstream network interface device that requests reduction of transmission of packets from the source queue associated with the upstream network interface device. In some examples, the source queue is identified in a congestion causing packet by the upstream network interface device and wherein the upstream network interface device comprises a prior hop network interface device.

20 Claims, 8 Drawing Sheets

(56) References Cited

U.S. PATENT DOCUMENTS

| | | | | |
|---|---|---|---|---|
| 2014/0140234 A1* | 5/2014 | Briscoe | .................. | H04L 47/11 |
| | | | | 370/252 |
| 2014/0293796 A1* | 10/2014 | Jeong | .................. | H04M 15/66 |
| | | | | 370/236 |
| 2015/0023173 A1* | 1/2015 | Sharma | .................. | H04L 45/22 |
| | | | | 370/236 |
| 2015/0188830 A1* | 7/2015 | Zhao | ...................... | H04L 47/27 |
| | | | | 370/235 |
| 2020/0287834 A1* | 9/2020 | Ramanathan | .......... | H04L 45/50 |
| 2020/0396170 A1* | 12/2020 | Gafni | ...................... | H04L 47/35 |
| 2023/0036088 A1* | 2/2023 | Shmilovici | ............. | H04L 45/74 |

OTHER PUBLICATIONS

Anderson, Thomas E. et al., "High-Speed Switch Scheduling for Local-Area Networks", AMC Transactions on Computer Systems, vol. 11, No. 4, Nov. 1993, pp. 319-352.

Goyal, Prateesh et al., "Backpressure Flow Control", arXiv:1909.09923v4, Mar. 29, 2021, 26 pages.

Kung, H. T. and Morris, Robert, "Credit-Based Flow Control for ATM Networks", IEEE Network, vol. 9, No. 2, Mar./Apr. 1995, 11 pages.

Lama, Victor, "An Introduction to Priority-based Flow Control" Fabric Specialist G500, White Paper, Feb. 28, 2011, 4 pages.

Oracle, "Managing Network Datalinks in Oracle® Solaris 11.2", https://docs.oracle.com/cd/E36784_01/html/E37516/gmfdb.html, Sep. 2014, 124 pages.

Ramakrishnan, K. et al., "The Addition of Explicit Congestion Notification (ECN) to IP", Network Working Group, https://datatracker.ietf.org/doc/html/rfc3168, Sep. 2001, 63 pages.

Cisco, "Chapter: Configuring Priority Flow Control", from Cisco Nexus 7000 Series NX-OS Quality of Service Configuration Guide, https://www.cisco.com/c/en/us/td/docs/switches/datacenter/nexus7000/sw/qos/config/cisco_nexus7000_qos_config_guide_8x/configuring_priority_flow_control.html, updated Dec. 23, 2016, 4 pages.

Goyal, Prateesh et al., "Backpressure Flow Control", ACM Digital Library, https://doi.org/10.1145/3375235.3375239, BS '19 Proceedings of the 2019 Workshop on Buffer Sizing, Article No. 4, pp. 1-3, BS '19, Dec. 2-3, 2019, Palo Alto, CA, USA, Published Jan. 29, 2020, 3 pages.

* cited by examiner

NETWORK INTERFACE DEVICE WITH FLOW CONTROL CAPABILITY

RELATED APPLICATION

The present application claims the benefit of priority of U.S. Provisional application 63/127,105, filed Dec. 17, 2020. The contents of that application are incorporated in its entirety herein.

DESCRIPTION

In a network of connected devices, congestion control is an end-to-end solution in which senders decide how much data to send based on an applied congestion control scheme, with some limited network feedback in the form of packet drops or delay, and intermediate hops forward packets or drop packets if a buffer is filled. Priority Flow Control (PFC) of IEEE 802.Qbb-2011 provides that when a network switch is running out of buffer space, it can send a pause frame to request other devices connected to one of their ports to stop sending traffic of a particular Class of Service (CoS). When congestion abates, the network switch can send a resume frame to the appropriate devices to resume transmission. Although PFC can assist with reducing packet drops, it can cause Head-of-Line (HoL) blocking. HoL blocking can occur when several flows share the same CoS. Even if only one flow in a CoS causes congestion, all flows of the CoS are paused, leading to degraded application performance, particularly for short, delay-sensitive applications.

DETAILED DESCRIPTION

Various examples include a network interface device that supports backpressure flow control for per-hop and per-flow congestion control. Some examples assign flows to individual queues, with packets of a flow occupying a queue and the queue storing packets for no other flows. A network interface device can monitor packet flows, and when queued packets for a flow exceed a threshold, the network interface device can notify an upstream sender device to reduce sending packets of a flow associated with a queue. When a number of packets of the congested flow reduce below the threshold, the network interface device can request or inform that the upstream device is permitted to resume transmission of packets in the flow. Some examples communicate flow control to a network interface device, which is one hop away, and flow control indicates a particular queue for which packet transmission is to be paused of whether packet transmission from the queue can resume. Accordingly, per-hop and per-flow congestion control can take place in a data center or among multiple data centers by allocating a queue to store packets of a single flow, pausing a flow by pausing a particular queue at a prior hop network device.

Various examples can reduce tail latency arising from pausing packet transmissions for a flow that is not intended to be flow controlled by targeting a queue that stores packets associated with a flow that is to be subject to flow control. Tail latency can refer to the worst-case latencies at very low probability.

Figure 1:
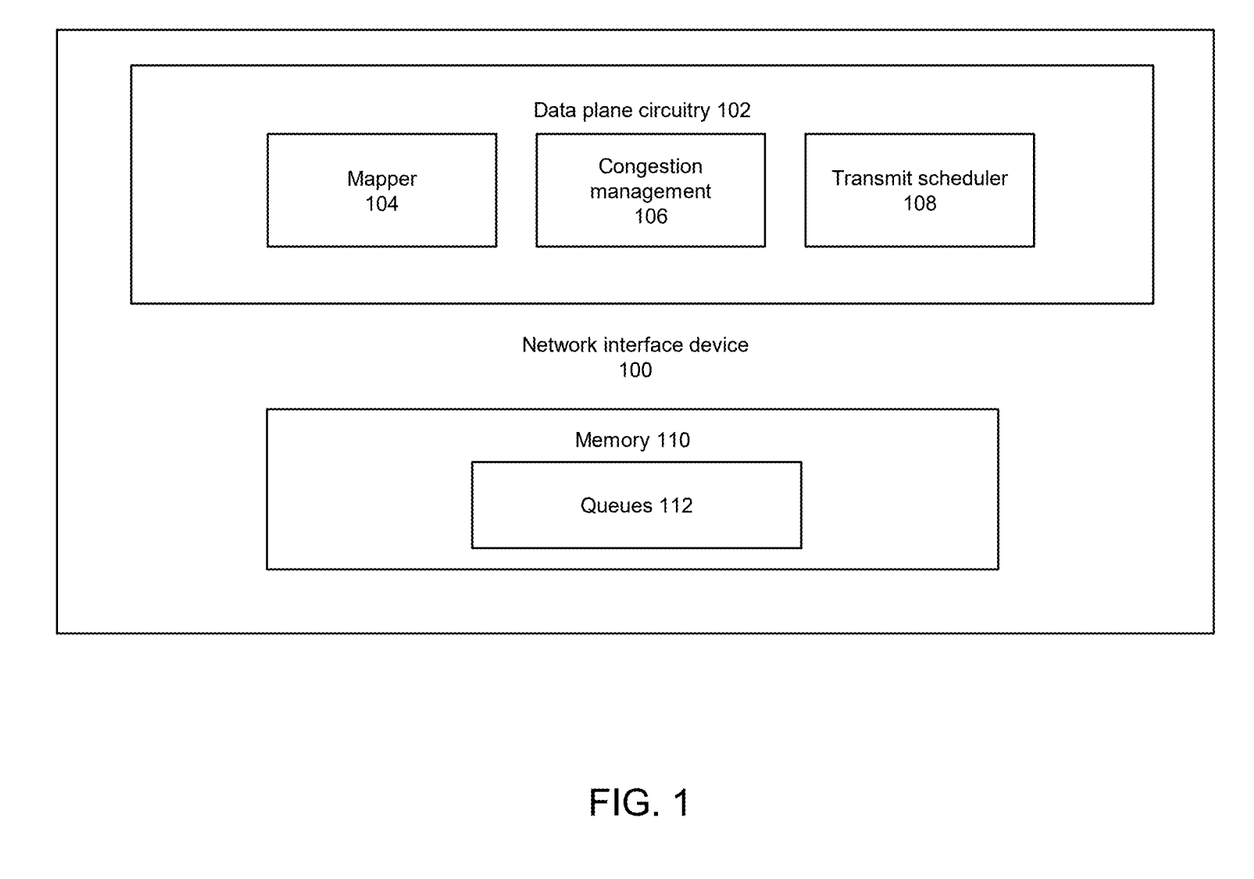
FIG. 1 depicts an example of a network interface device.

FIG. 1 depicts an example of a network interface device. Network interface device 100 can be implemented as one or more of: a network interface controller (NIC) (e.g., endpoint receiver NIC or NIC in a path from sender to receiver), a remote direct memory access (RDMA)-enabled NIC, Smart-NIC, router, switch, forwarding element, infrastructure processing unit (IPU), data processing unit (DPU).

Data plane circuitry 102 can be configured to perform match-action operations on received packets to identify packet processing rules and prior hops using information stored in a ternary content-addressable memory (TCAM) tables or exact match tables in some embodiments. For example, match-action tables or circuitry can be used whereby a hash of a portion of a packet is used as an index to find an entry. As described herein, data plane circuitry 102 can be configured to perform operations of mapper 104, congestion management 106, and/or transmission scheduler 108.

Multiples queues 112 can be allocated in at least one memory device 110. Queue occupancy information can be available at the egress of network interface device 100 and such queue occupancy information propagated to the ingress of network interface device 100. In some examples, at ingress, mapper 104 can allocate a queue among queues 112 to store packets of a single flow. Packets of new flows can be assigned to unallocated (empty) queues.

If a flow is assigned to a queue, a newly received packet of the flow can be assigned to the queue associated with the flow. Flows that have already been assigned to a queue can retain queue assignment, even if other unoccupied queues become available. However, if no queue is available to store packets of a single flow, mapper 104 can allocate packets of multiple flows to a single queue. The single queue can be selected as a least occupied queue or by a pseudo-random selection of occupied queues. In some cases, if multiple flows are associated with an occupied queue, one of the flows can be migrated to be associated with an unoccupied queue after the unoccupied queue becomes available.

In some examples, mapper 104 can access a hash table, where a key is a concatenation of an egress port and flow identifier (ID) of the received packet. A hash table can include a key-value store where a key includes <Hash(flow identifier (ID), egress port> and its corresponding value is an assigned queue and number of packets assigned to the queue. For a received packet, mapper 104 can identify a corresponding entry in the table. If a flow associated with the packet is not assigned to a queue or is a new flow not previously received at the network interface device 100, mapper 104 can assign the new flow and packet to a queue. If a packet of the flow was previously received by network interface device 100 and a queue is assigned to the flow, mapper 104 can increment a packet counter and use a previous queue assignment.

Mapper 104 can map flows into queues and reduce instances when multiple flows are mapped to same queue. In cases where flow control applies to packets in a queue, reducing a number of flows assigned to a single queue can assist with avoiding head of line (HoL) blocking or blocking packets from egressing that are not subject to congestion control or backpressure feedback from another node to pause transmission of packets of a particular flow or particular queue.

An example pseudo code for queue assignment performed by mapper 104 can be as follows.

DataStructure: FlowHashTable (Single dimensional array)
    Location: Ingress Pipeline
    Key: <EgressPort, Hash(FID)>
    Value: <QAssignment, Size, Time>
    //In the Ingress pipeline
    Enqueue(Packet)
        Key=Packet.EgressPort++Hash(Packet.FID)
        OldSize=FlowHashTable[key].Size
        FlowHashTable[key].Size+=1/increase packet count in queue
        OldTime=FlowHashTable[key].Time/time stamp of when packet added to queue
        FlowHashTable[key].Time=Now
        If (OldSize==0 && (OldTime+StickyQueueDuration)<Now)
            FlowHashTable[key].QAssignment= GetEmptyUnpausedQueue(Packet.EgressPort)
        Packet.QAssignment=FlowHashTable[key].QAssignment/if no empty queue, use existing queue assignment to used queue EmptyUnpausedQ can represent a datastructure that tracks one EmptyUnpausedQ per EgressPort. A thread can be executed (using existing PausedBitMap packets) that checks the Qdepth of all the queues one by one, and if the Qdepth is zero and the queue is not paused, the EmptyUnpausedQ for the EgressPort is updated to empty.

An example pseudo code for updating packet count in a queue performed by mapper 104 that recirculates a packet (in ingress pipeline of data plane circuitry) or otherwise indicates a packet was dequeued can be as follows. Note that if a number of packets in a queue is 0, then mapper 104 can identify a queue as empty.

Dequeue(Packet)
        Key=Packet.EgressPort++Hash(Packet.FID)
        FlowHashTable[key].Size-=1
        FlowHashTable[key].Time=Now // time stamp of when packet removed from queue A packet may be used herein to refer to various formatted collections of bits that may be sent across a network, such as Ethernet frames, IP packets, TCP segments, UDP datagrams, etc. Also, as used in this document, references to L2, L3, L4, and L7 layers (or layer 2, layer 3, layer 4, and layer 7) are references respectively to the second data link layer, the third network layer, the fourth transport layer, and the seventh application layer of the OSI (Open System Interconnection) layer model.

A flow can be a sequence of packets being transferred between two endpoints, generally representing a single session using a known protocol. Accordingly, a flow can be identified by a set of defined tuples and, for routing purpose, a flow is identified by the two tuples that identify the endpoints, i.e., the source and destination addresses. For content based services (e.g., load balancer, firewall, Intrusion detection system etc.), flows can be discriminated at a finer granularity by using N-tuples (e.g., source address, destination address, IP protocol, transport layer source port, and destination port). A packet in a flow is expected to have the same set of tuples in the packet header.

A packet flow to be controlled can be identified by a combination of tuples (e.g., Ethernet type field, source and/or destination IP address, source and/or destination User Datagram Protocol (UDP) ports, source/destination TCP ports, or any other header field) and a unique source and destination queue pair (QP) number or identifier.

Congestion management 106 can perform per hop, per-flow flow control of transmission of packets by a prior hop upstream device by specification of a particular queue to pause or reduce transmission from such particular queue. When a queue in network interface device 100 reaches or exceeds a threshold capacity level, the network device can issue a backpressure or congestion notification to a source network device to pause or reduce transmission of packets of a particular flow. The source network device can be connected as a prior hop from the network device. A prior hop device can correspond to an adjacent router or device with layer-2 connectivity to the source network device. For example, a receive or ingress port of the source network device that receives a packet can be used to identify a prior hop upstream network interface device. In some examples, a prior hop upstream device can identify an originating source queue associated with a transmitted packet. For example, an upstream device can write an originating source queue identifier of a packet into a packet header field (e.g., an Ethernet header field) when or prior to egressing the packet. To pause or resume transmission from a queue at the prior hop upstream device, congestion management 106 can specify the originating source queue and egress port of the upstream device to pause.

Concerning congestion detection, congestion management 106 can detect congestion for a flow by detecting congestion at a queue. When the number of buffered packets in a queue meets or exceeds a threshold, the queue and its associated flow is designated as to be paused or transmit rate reduced. Example pseudo code for congestion management 106 determining when to pause or reduce transmit rate of a prior hop upstream network interface device can be follows. On enqueue of a packet from flow X, if BQ>ThQ, pause flow X at upstream device by pausing the upstream queue of flow X, where:

Q can represent egress queue assigned to flow X
    BQ can represent a number of bytes in queue Q assigned to flow X
    RQ can represent a drain rate of queue Q assigned to flow X
    ThQ can represent a Pause Threshold=RQ*(1-Hop bandwidth delay product (BDP).

An example pseudo code for tracking which queues are paused can be as follows.

Data Structures: ToBePausedTable //
    Location: Ingress Pipeline of data plane circuitry
    Key: <IngressPort, UpstreamQ>
    Value: Counter
    Data Structures: ToBePausedMap(Single dimensional array)
    Location: Ingress Pipeline
    Key: <IngressPort>
    Value: BitMap
    //In the ingress pipeline
    Enqueue(Packet)
        IngressPort=Packet.IngressPort
        If QdepthTable[IngressPort, Packet.QAssignment]> PauseThreshold[Packet.EgressPort] // determine if queue depth exceeds pause threshold
            ToBePausedTable[IngressPort, Packet.UpstreamQ]+=1 // count number of packets above threshold for upstream queue is to be paused and ingress port ToBePausedMap[IngressPort]|=2 ** Packet.UpstreamQ // bit map mark paused port
            Packet.MetaData.CounterIncr=True When a number of packets above the threshold have been transmitted from the congested queue, congestion management 106 can designate a flow and its queue in an upstream prior hop network interface to resume transmission or increase transmit rate. An example pseudo code for determining when to send a packet to an upstream prior hop network interface to resume transmission or increase transmit rate can be as follows.

Dequeue(Packet)
        IngressPort=Packet.IngressPort
    If Packet.MetaData.CounterIncr
        ToBePausedTable[IngressPort, Packet.UpstreamQ]-=1 // decrement number of packets above threshold that are in paused queue
        If ToBePausedTable[IngressPort, Packet.UpstreamQ]== 0 // determine if packets that caused threshold to be exceeded have been sent
        ToBePausedMap[IngressPort]&=~(2 ** Packet.UpstreamQ) // Cause resume indicator packet to be sent
        Packet.Resume=True
        Send(Packet, IngressPort)

Periodically, prior hop devices can communicate their queue status to avoid deadlocks caused by potential packet drops. An example pseudo code for communicating which queues are to be paused and which queues are not to be paused can be as follows.

On Enqueue(GeneratedPausePacket)
        IngressPort=GeneratedPausePacket.IngressPort
        GeneratedPausePacket.BitMap=ToBePausedMap[IngressPort] // when cross threshold of congestion, set bitmap specifying queue to pause. Send bitmap to upstream network interface device to indicate which are not paused and which are paused
        Send(GeneratedPausePacket, IngressPort)
    Enqueue(Packet)
        If ReceivedBitMap[Packet.EgressPort]& 2 ** Packet.Qassignment>0
        PauseQ(<Packet.EgressPort, Packet.Qassignment>)

If an upstream prior hop network interface device receives the bitmap or indicator of paused queues and identifies transmission from a queue or queues is to be paused or its transmit rate is to be reduced, then the upstream prior hop network interface device can pause or reduce transmit rate of the identified queue(s).

Transmission scheduler 108 can schedule packets in or associated with queues 112 for transmission using an applicable scheduling policy. Receipt of a backpressure indicator by network interface device 100 can cause a pause of transmission or reduction of rate of transmission from a particular queue to be applied by transmission scheduler 108. In some examples, transmission scheduler 108 can pause transmission of packets from a queue or queues among queues 112 based on receipt of a flow control message from a prior hop by use of backpressure flow control. The flow control message can identify the flow to pause and the network device can pause transmission from a queue associated with that flow. In some examples, a transmit rate of a flow can be specified to transmission scheduler 108 by a downstream node and the sender does not recalculate a transmit rate.

Figure 2:
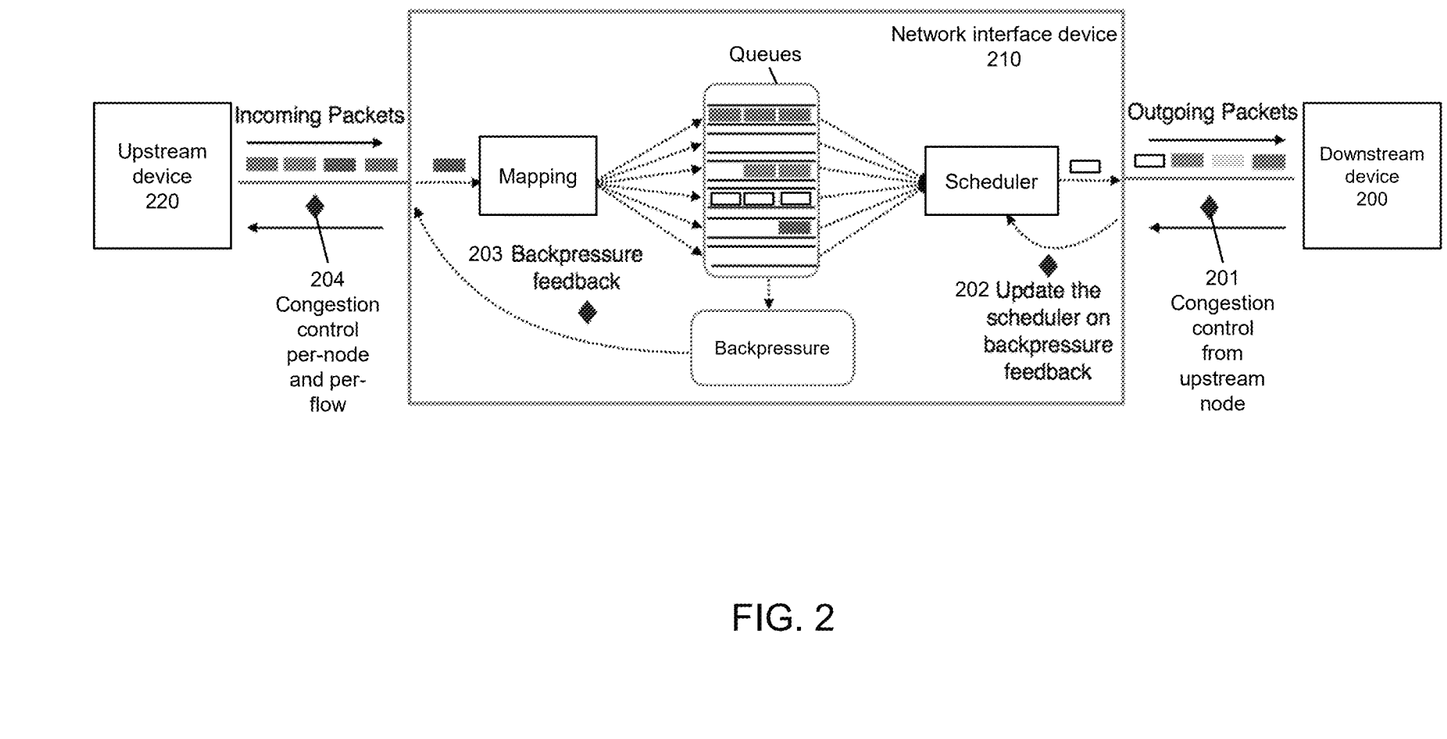
FIG. 2 depicts an example operation of a network interface device.

FIG. 2 depicts an example sequence for per-hop flow control. At 201, congestion control can be received from a downstream network interface device 200. Congestion control can identify a particular queue to pause transmission from. In some examples, a header of a packet can identify a queue subject to transmission pausing or reduced transmission rate. At 202, the scheduler of network interface device 210 can update the scheduling of packets from the queue subject to transmission pausing or reduced transmission rate. At 203, based on detection of congestion of a queue among its queues, backpressure feedback can be requested to be provided to an upstream network interface device 220. At 204, congestion control per-node and per-flow can be sent to the upstream device 220 with the queue subject to transmission pausing or reduced transmission rate. Congestion control at upstream device 220 can identify a particular queue subject to transmission pausing or reduced transmission rate.

Figure 3:
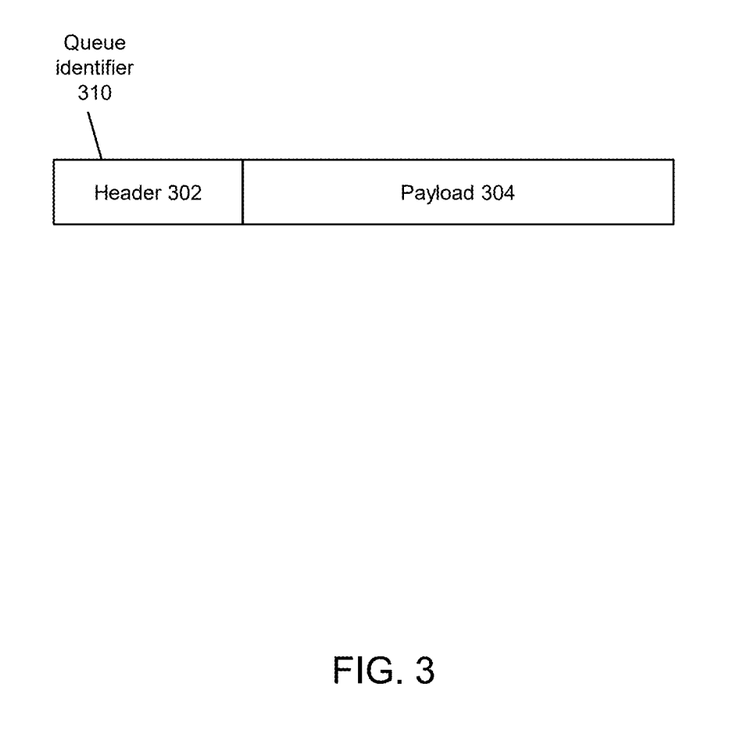
FIG. 3 depicts an example packet format.

FIG. 3 depicts an example format of a packet that includes an identifier of a queue. For example, a packet can include header 302 and payload 304. Header 302 can include a field of one or more bits that specify a queue identifier 310 of a queue to pause or subject to reduced transmission rate and/or an egress port from which to pause transmission. For example, the field can be in an Ethernet header.

In some examples, queue identifier can be conveyed in metadata of in-band telemetry schemes such as those described in: "In-band Network Telemetry (INT) Dataplane Specification, v2.0," P4.org Applications Working Group (February 2020); IETF draft-lapukhov-dataplane-probe-01, "Data-plane probe for in-band telemetry collection" (2016); or IETF draft-ietf-ippm-ioam-data-09, "In-situ Operations, Administration, and Maintenance (IOAM)" (Mar. 8, 2020). In-situ Operations, Administration, and Maintenance (IOAM) records operational and telemetry information in the packet while the packet traverses a path between two points in the network. IOAM discusses the data fields and associated data types for in-situ OAM. In-situ OAM data fields can be encapsulated into a variety of protocols such as NSH, Segment Routing, Geneve, IPv6 (via extension header), or IPv4.

Figure 4A:
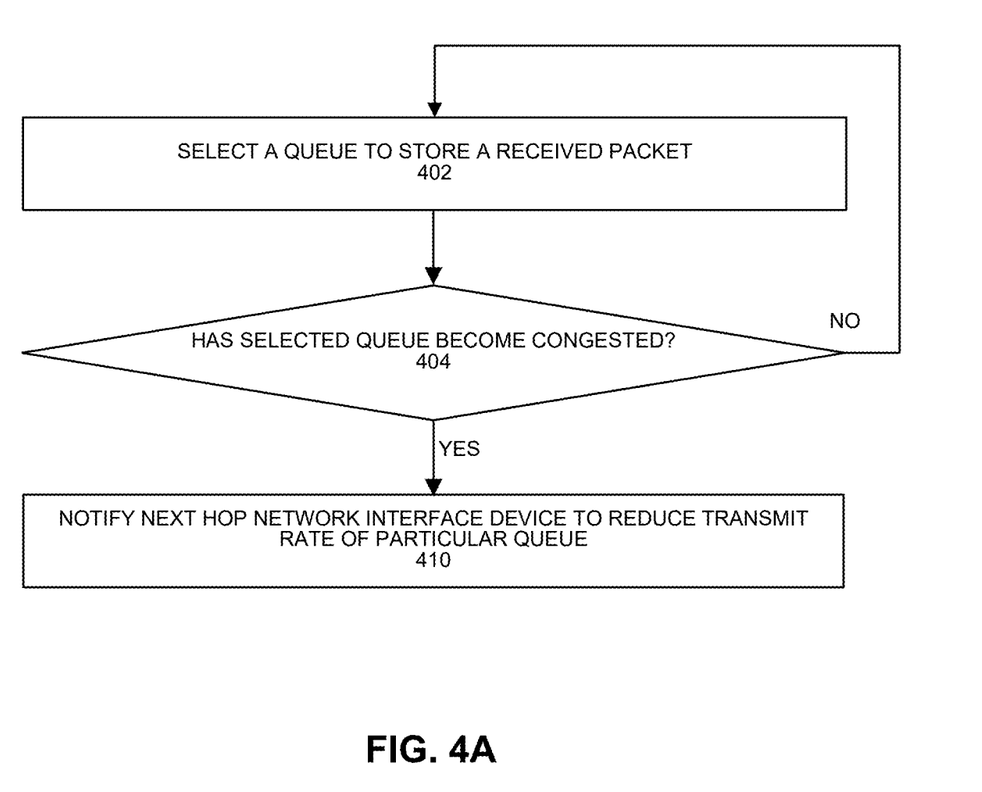
FIGS. 4A and 4B depicts an example process.

FIG. 4A depicts an example process that can be used to identify a queue to store a packet. The process can be performed by a network interface device. At 402, in response to receipt of a packet, the network interface device can select a queue to store the received packet. The queue can be selected to be a queue that stores only packets associated with a flow of the received packet. However, if no queue is available to store only packets associated with a flow of the received packet, the received packet can be stored in a queue that stores packets of another queue.

At 404, the network interface device can determine if the selected queue is congested. The selected queue can be considered congested if a number of packets assigned to the selected queue meets or exceeds a threshold level. Based on the selected queue being considered congested, the process can continue to 410. Based on the selected queue not being considered congested, the process can continue to 402.

At 410, the network interface device can determine a source of congestion and notify the source of congestion to reduce or pause packet transmission. For example, a packet received from an upstream network interface device that leads to congestion of a queue can identify a source queue and/or egress port from which the congestion causing packet was egressed at the upstream network interface device. To notify the source of congestion to reduce or pause packet transmission, the network interface device can generate a packet that identifies the source queue and/or egress port of the congestion causing packet. The packet can be based on Priority Flow Control (PFC) in some examples. In response, the upstream network interface device can pause the identified queue or reduce a rate of packet transmission from the identified queue.

Figure 4B:
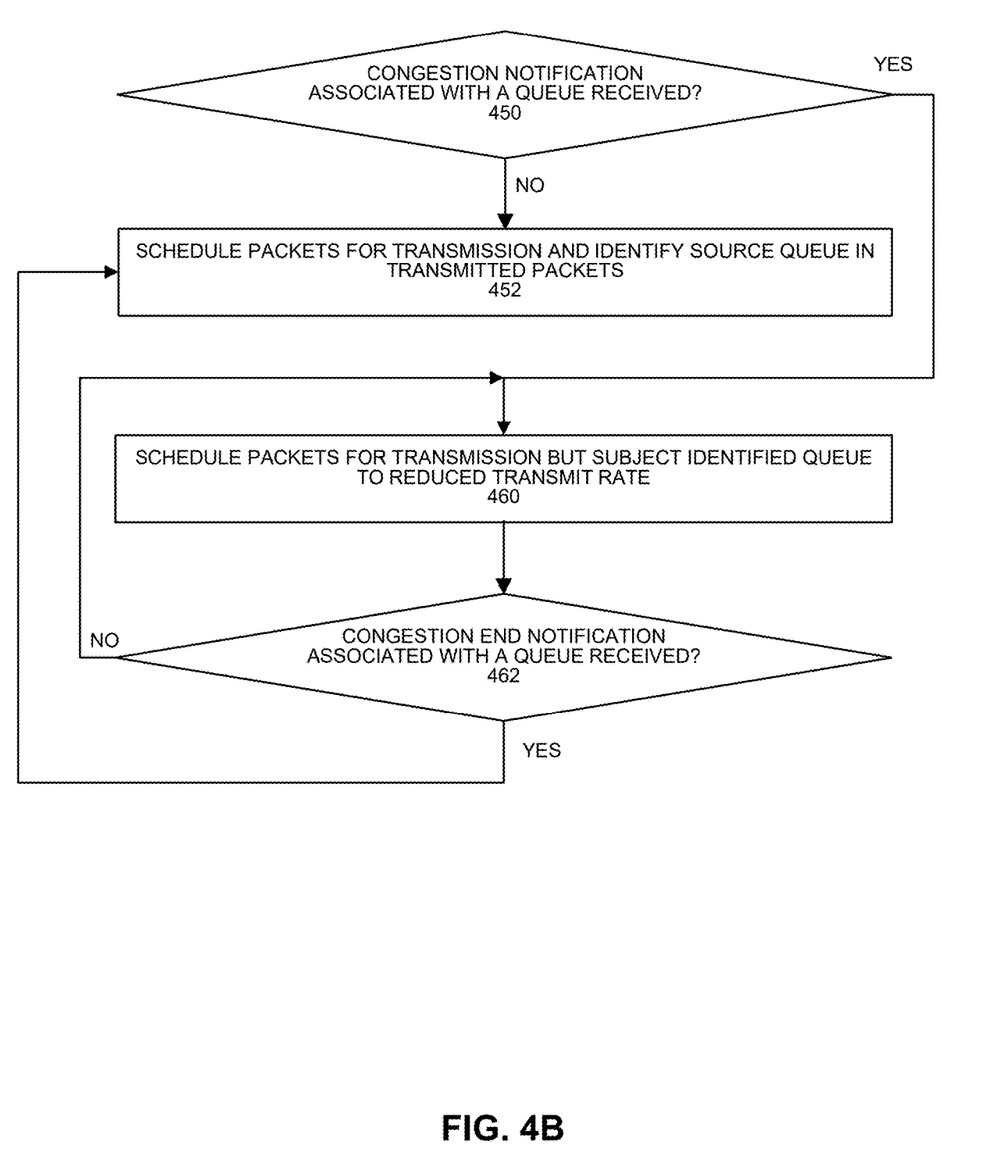

FIG. 4B depicts an example process that can be performed in connection with packet transmission scheduling. In some examples, the process of FIG. 4B can be performed in response to receipt of a packet that identifies the source queue of the congestion causing packet performed at 410 by a downstream network interface device. At 450, a determination can be made if an identifier of the source queue of a congestion causing packet has been received. If an identifier of the source queue of a congestion causing packet has not been received or there is no congestion notification, the process can continue to 452. If an identifier of the source queue of a congestion causing packet has been received, the process can continue to 460.

At 452, scheduling of transmission of packets from a source queue can be performed according to an applicable scheduling scheme. The packet can include an identifier of its source queue to assist a downstream device in identifying a particular queue that is a source of congestion causing packets.

At 460, scheduling of transmission of packets from a source queue can occur according to an applicable scheduling scheme however a queue identified as to be reduced will have transmission rate paused or reduced.

At 462, a determine is made if an end of congestion notification is received with an identifier of a queue. If an end of congestion notification with an identifier of a queue has not been received or no congestion end notification has been received, the process can continue to 460. If an end of congestion notification with an identifier of a queue has been received or a congestion end notification has been received, the process can continue to 452.

Figure 5:
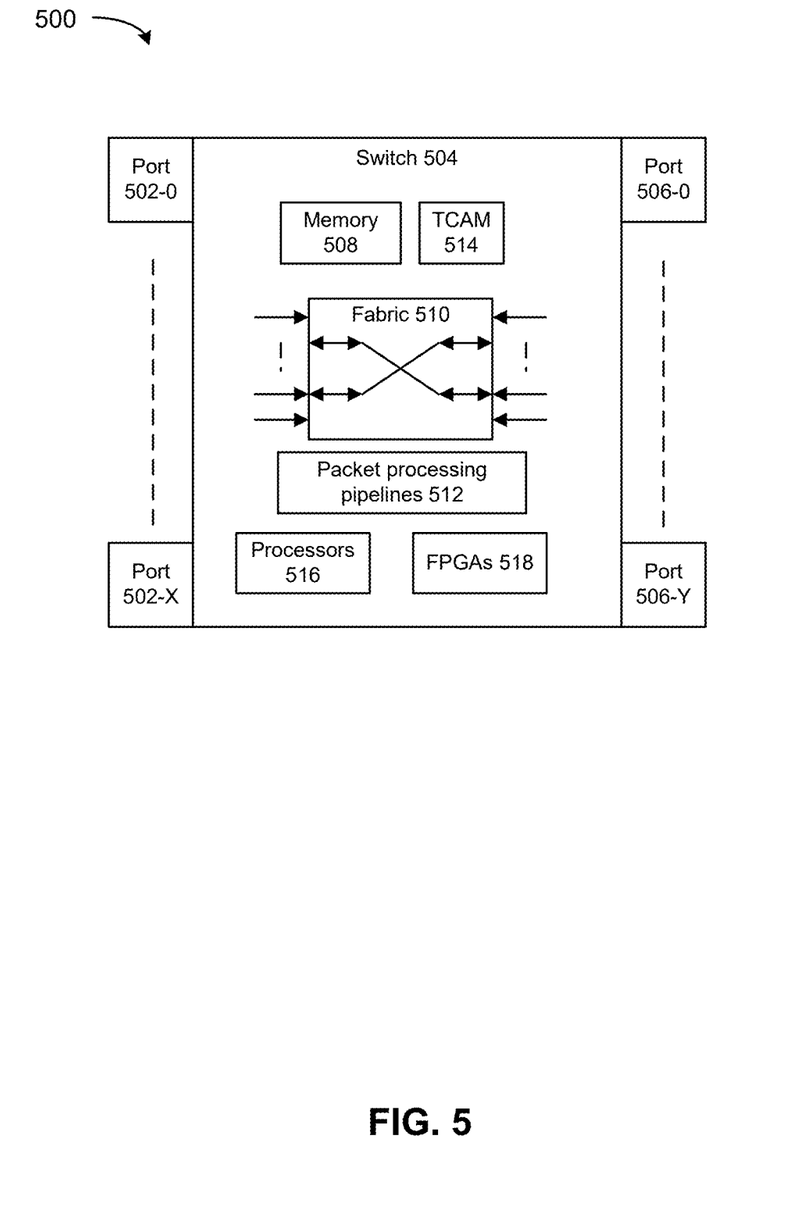
FIG. 5 depicts an example switch.

FIG. 5 depicts an example switch. Various embodiments can be used in or with the switch to respond to identification of a congestion causing queue by reducing packet transmission from that queue, identifying a source queue of a transmitted packet, or identifying a particular congested queue to an upstream node, as described herein. Switch 504 can route packets or frames of any format or in accordance with any specification from any port 502-0 to 502-X to any of ports 506-0 to 506-Y (or vice versa). Any of ports 502-0 to 502-X can be connected to a network of one or more interconnected devices. Similarly, any of ports 506-0 to 506-X can be connected to a network of one or more interconnected devices.

In some examples, switch fabric 510 can provide routing of packets from one or more ingress ports for processing prior to egress from switch 504. Switch fabric 510 can be implemented as one or more multi-hop topologies, where example topologies include torus, butterflies, buffered multi-stage, etc., or shared memory switch fabric (SMSF), among other implementations. SMSF can be any switch fabric connected to ingress ports and all egress ports in the switch, where ingress subsystems write (store) packet segments into the fabric's memory, while the egress subsystems read (fetch) packet segments from the fabric's memory.

Memory 508 can be configured to store packets received at ports prior to egress from one or more ports. Packet processing pipelines 512 can determine which port to transfer packets or frames to using a table that maps packet characteristics with an associated output port. Packet processing pipelines 512 can be configured to perform match-action on received packets to identify packet processing rules and prior hops using information stored in a ternary content-addressable memory (TCAM) tables or exact match tables in some embodiments. For example, match-action tables or circuitry can be used whereby a hash of a portion of a packet is used as an index to find an entry. Packet processing pipelines 512 can implement access control list (ACL) or packet drops due to queue overflow. Packet processing pipelines 512 can be configured to respond to identification of a congestion causing queue by reducing packet transmission from that queue, identifying a source queue of a transmitted packet, or identifying a particular congested queue to an upstream node.

Configuration of operation of packet processing pipelines 512, including its data plane, can be programmed using P4, C, Python, Broadcom Network Programming Language (NPL), or x86 compatible executable binaries or other executable binaries. Processors 516 and FPGAs 518 can be utilized for packet processing or modification.

Figure 6:
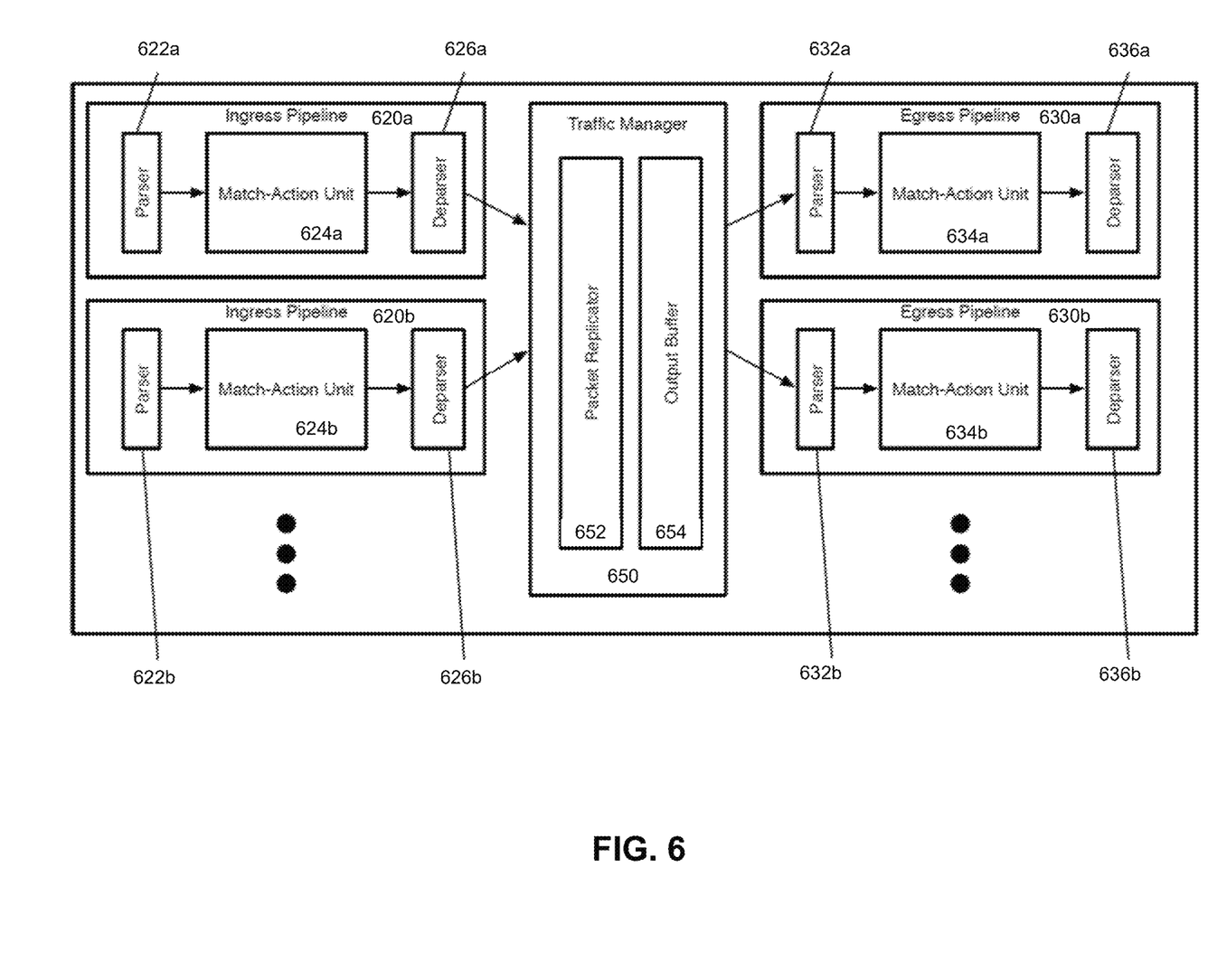
FIG. 6 depicts an example switch.

FIG. 6 depicts an example network forwarding system that can be used as a switch or router. For example, FIG. 6 illustrates several ingress pipelines 620, a traffic management unit (referred to as a traffic manager) 650, and several egress pipelines 630. Though shown as separate structures, in some embodiments the ingress pipelines 620 and the egress pipelines 630 can use the same circuitry resources. In some embodiments, the pipeline circuitry is configured to process ingress and/or egress pipeline packets synchronously, as well as non-packet data. That is, a particular stage of the pipeline may process any combination of an ingress packet, an egress packet, and non-packet data in the same clock cycle. However, in other embodiments, the ingress and egress pipelines are separate circuitry. In some of these other embodiments, the ingress pipelines also process the non-packet data.

In some examples, in response to receiving a packet, the packet is directed to one of the ingress pipelines 620 where an ingress pipeline which may correspond to one or more ports of a hardware forwarding element. After passing through the selected ingress pipeline 620, the packet is sent to the traffic manager 650, where the packet is enqueued and placed in the output buffer 654. In some embodiments, the ingress pipeline 620 that processes the packet specifies into which queue the packet is to be placed by the traffic manager 650 (e.g., based on the destination of the packet or a flow identifier of the packet). The traffic manager 650 then dispatches the packet to the appropriate egress pipeline 630 where an egress pipeline may correspond to one or more ports of the forwarding element. In some embodiments, there is no necessary correlation between which of the ingress pipelines 620 processes a packet and to which of the egress pipelines 630 the traffic manager 650 dispatches the packet. That is, a packet might be initially processed by ingress pipeline 620b after receipt through a first port, and then subsequently by egress pipeline 630a to be sent out a second port, etc.

A least one ingress pipeline 620 includes a parser 622, a match-action unit (MAU) 624, and a deparser 626. Similarly, egress pipeline 630 can include a parser 632, a MAU 634, and a deparser 636. The parser 622 or 632, in some embodiments, receives a packet as a formatted collection of bits in a particular order, and parses the packet into its constituent header fields. In some examples, the parser starts from the beginning of the packet and assigns header fields to fields (e.g., data containers) for processing. In some embodiments, the parser 622 or 632 separates out the packet headers (up to a designated point) from the payload of the packet, and sends the payload (or the entire packet, including the headers and payload) directly to the deparser without passing through the MAU processing.

The MAU 624 or 634 can perform processing on the packet data. In some embodiments, the MAU includes a sequence of stages, with each stage including one or more match tables and an action engine. A match table can include a set of match entries against which the packet header fields are matched (e.g., using hash tables), with the match entries referencing action entries. When the packet matches a particular match entry, that particular match entry references a particular action entry which specifies a set of actions to perform on the packet (e.g., sending the packet to a particular port, modifying one or more packet header field values, dropping the packet, mirroring the packet to a mirror buffer, etc.). The action engine of the stage can perform the actions on the packet, which is then sent to the next stage of the MAU. For example, MAU(s) can be used to respond to identification of a congestion causing queue or egress port by reducing packet transmission from that queue or egress port, identify a source queue of a transmitted packet, or identify a particular congested queue to an upstream node.

The deparser 626 or 636 can reconstruct the packet using the PHV as modified by the MAU 624 or 634 and the payload received directly from the parser 622 or 632. The deparser can construct a packet that can be sent out over the physical network, or to the traffic manager 650. In some embodiments, the deparser can construct this packet based on data received along with the PHV that specifies the protocols to include in the packet header, as well as its own stored list of data container locations for each possible protocol's header fields.

Traffic manager 650 can include a packet replicator 652 and output buffer 654. In some embodiments, the traffic manager 650 may include other components, such as a feedback generator for sending signals regarding output port failures, a series of queues and schedulers for these queues, queue state analysis components, as well as additional components. The packet replicator 652 of some embodiments performs replication for broadcast/multicast packets, generating multiple packets to be added to the output buffer (e.g., to be distributed to different egress pipelines).

The output buffer 654 can be part of a queuing and buffering system of the traffic manager in some embodiments. The traffic manager 650 can provide a shared buffer that accommodates any queuing delays in the egress pipelines. In some embodiments, this shared output buffer 654 can store packet data, while references (e.g., pointers) to that packet data are kept in different queues for each egress pipeline 630. The egress pipelines can request their respective data from the common data buffer using a queuing policy that is control-plane configurable. When a packet data reference reaches the head of its queue and is scheduled for dequeuing, the corresponding packet data can be read out of the output buffer 654 and into the corresponding egress pipeline 630. In some embodiments, packet data may be referenced by multiple pipelines (e.g., for a multicast packet). In this case, the packet data is not removed from this output buffer 654 until all references to the packet data have cleared their respective queues.

Figure 7:
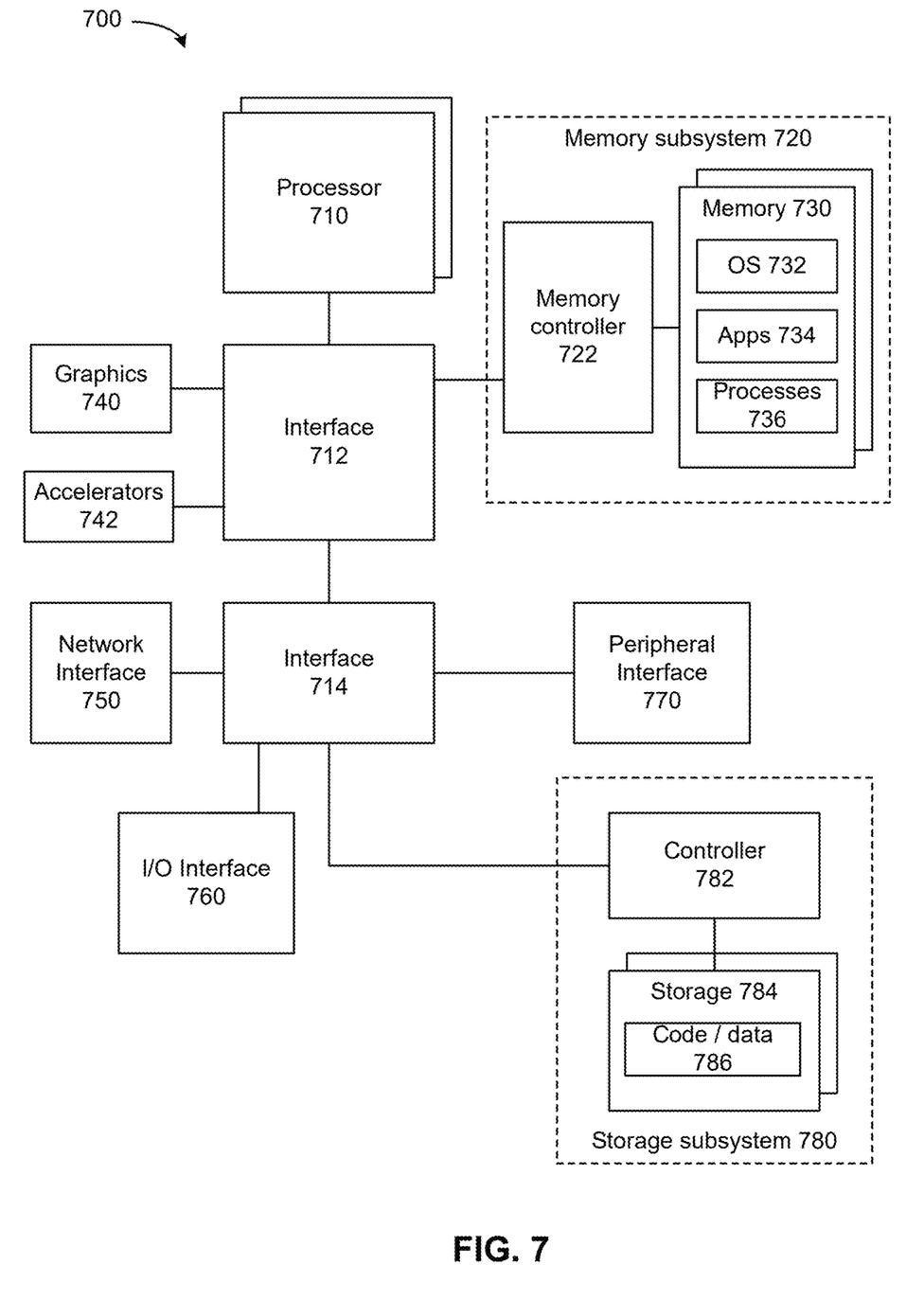
FIG. 7 depicts an example system.

FIG. 7 depicts an example computing system. System 700 can be used to program network interface device 750 to respond to identification of a congestion causing queue or egress port by reducing packet transmission from that queue or egress port, identifying a source queue of or egress port a transmitted packet, or identifying a particular congested queue to an upstream node, as described herein. Processor 710 can include any type of microprocessor, central processing unit (CPU), graphics processing unit (GPU), processing core, or other processing hardware to provide processing for system 700, or a combination of processors. Processor 710 controls the overall operation of system 700, and can be or include, one or more programmable general-purpose or special-purpose microprocessors, digital signal processors (DSPs), programmable controllers, application specific integrated circuits (ASICs), programmable logic devices (PLDs), or the like, or a combination of such devices.

In one example, system 700 includes interface 712 coupled to processor 710, which can represent a higher speed interface or a high throughput interface for system components that needs higher bandwidth connections, such as memory subsystem 720 or graphics interface components 740, or accelerators 742. Interface 712 represents an interface circuit, which can be a standalone component or integrated onto a processor die. Where present, graphics interface 740 interfaces to graphics components for providing a visual display to a user of system 700. In one example, graphics interface 740 can drive a high definition (HD) display that provides an output to a user. High definition can refer to a display having a pixel density of approximately 100 PPI (pixels per inch) or greater and can include formats such as full HD (e.g., 1080p), retina displays, 4K (ultra-high definition or UHD), or others. In one example, the display can include a touchscreen display. In one example, graphics interface 740 generates a display based on data stored in memory 730 or based on operations executed by processor 710 or both. In one example, graphics interface 740 generates a display based on data stored in memory 730 or based on operations executed by processor 710 or both.

Accelerators 742 can be a fixed function or programmable offload engine that can be accessed or used by a processor 710. For example, an accelerator among accelerators 742 can provide compression (DC) capability, cryptography services such as public key encryption (PKE), cipher, hash/authentication capabilities, decryption, or other capabilities or services. In some embodiments, in addition or alternatively, an accelerator among accelerators 742 provides field select controller capabilities as described herein. In some cases, accelerators 742 can be integrated into a CPU socket (e.g., a connector to a motherboard or circuit board that includes a CPU and provides an electrical interface with the CPU). For example, accelerators 742 can include a single or multi-core processor, graphics processing unit, logical execution unit single or multi-level cache, functional units usable to independently execute programs or threads, application specific integrated circuits (ASICs), neural network processors (NNPs), programmable control logic, and programmable processing elements such as field programmable gate arrays (FPGAs) or programmable logic devices (PLDs). Accelerators 742 can provide multiple neural networks, CPUs, processor cores, general purpose graphics processing units, or graphics processing units can be made available for use by artificial intelligence (AI) or machine learning (ML) models. For example, the AI model can use or include one or more of: a reinforcement learning scheme, Q-learning scheme, deep-Q learning, or Asynchronous Advantage Actor-Critic (A3C), combinatorial neural network, recurrent combinatorial neural network, or other AI or ML model. Multiple neural networks, processor cores, or graphics processing units can be made available for use by AI or ML models.

Memory subsystem 720 represents the main memory of system 700 and provides storage for code to be executed by processor 710, or data values to be used in executing a routine. Memory subsystem 720 can include one or more memory devices 730 such as read-only memory (ROM), flash memory, one or more varieties of random access memory (RAM) such as DRAM, or other memory devices, or a combination of such devices. Memory 730 stores and hosts, among other things, operating system (OS) 732 to provide a software platform for execution of instructions in system 700. Additionally, applications 734 can execute on the software platform of OS 732 from memory 730. Applications 734 represent programs that have their own operational logic to perform execution of one or more functions. Processes 736 represent agents or routines that provide auxiliary functions to OS 732 or one or more applications 734 or a combination. OS 732, applications 734, and processes 736 provide software logic to provide functions for system 700. In one example, memory subsystem 720 includes memory controller 722, which is a memory controller to generate and issue commands to memory 730. It will be understood that memory controller 722 could be a physical part of processor 710 or a physical part of interface 712. For example, memory controller 722 can be an integrated memory controller, integrated onto a circuit with processor 710.

In some examples, OS 732 can be Linux®, Windows® Server or personal computer, FreeBSD®, Android®, MacOS®, iOS®, VMware vSphere, openSUSE, RHEL, CentOS, Debian, Ubuntu, or any other operating system. The OS and driver can execute on a CPU sold or designed by Intel®, ARM®, AMD®, Qualcomm®, IBM®, Texas Instruments®, among others.

While not specifically illustrated, it will be understood that system 700 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a Hyper Transport or industry standard architecture (ISA) bus, a small computer system interface (SCSI) bus, a universal serial bus (USB), or an Institute of Electrical and Electronics Engineers (IEEE) standard 1394 bus (Firewire).

In one example, system 700 includes interface 714, which can be coupled to interface 712. In one example, interface 714 represents an interface circuit, which can include standalone components and integrated circuitry. In one example, multiple user interface components or peripheral components, or both, couple to interface 714. Network interface 750 provides system 700 the ability to communicate with remote devices (e.g., servers or other computing devices) over one or more networks. Network interface 750 can include an Ethernet adapter, wireless interconnection components, cellular network interconnection components, USB (universal serial bus), or other wired or wireless standards-based or proprietary interfaces. Network interface 750 can transmit data to a device that is in the same data center or rack or a remote device, which can include sending data stored in memory.

Some examples of network interface 750 are part of an Infrastructure Processing Unit (IPU) or data processing unit (DPU) or utilized by an IPU or DPU. An xPU can refer at least to an IPU, DPU, GPU, GPGPU, or other processing units (e.g., accelerator devices). An IPU or DPU can include a network interface with one or more programmable pipelines or fixed function processors to perform offload of operations that could have been performed by a CPU. The IPU or DPU can include one or more memory devices. In some examples, the IPU or DPU can perform virtual switch operations, manage storage transactions (e.g., compression, cryptography, virtualization), and manage operations performed on other IPUs, DPUs, servers, or devices.

In one example, system 700 includes one or more input/output (I/O) interface(s) 760. I/O interface 760 can include one or more interface components through which a user interacts with system 700 (e.g., audio, alphanumeric, tactile/touch, or other interfacing). Peripheral interface 770 can include any hardware interface not specifically mentioned above. Peripherals refer generally to devices that connect dependently to system 700. A dependent connection is one where system 700 provides the software platform or hardware platform or both on which operation executes, and with which a user interacts.

In one example, system 700 includes storage subsystem 780 to store data in a nonvolatile manner. In one example, in certain system implementations, at least certain components of storage 780 can overlap with components of memory subsystem 720. Storage subsystem 780 includes storage device(s) 784, which can be or include any conventional medium for storing large amounts of data in a nonvolatile manner, such as one or more magnetic, solid state, or optical based disks, or a combination. Storage 784 holds code or instructions and data 786 in a persistent state (e.g., the value is retained despite interruption of power to system 700). Storage 784 can be generically considered to be a "memory," although memory 730 is typically the executing or operating memory to provide instructions to processor 710. Whereas storage 784 is nonvolatile, memory 730 can include volatile memory (e.g., the value or state of the data is indeterminate if power is interrupted to system 700). In one example, storage subsystem 780 includes controller 782 to interface with storage 784. In one example controller 782 is a physical part of interface 714 or processor 710 or can include circuits or logic in both processor 710 and interface 714.

A volatile memory is memory whose state (and therefore the data stored in it) is indeterminate if power is interrupted to the device. Dynamic volatile memory uses refreshing the data stored in the device to maintain state. One example of dynamic volatile memory incudes DRAM (Dynamic Random Access Memory), or some variant such as Synchronous DRAM (SDRAM). An example of a volatile memory include a cache. A memory subsystem as described herein may be compatible with a number of memory technologies, such as DDR3 (Double Data Rate version 3, original release by JEDEC (Joint Electronic Device Engineering Council) on Jun. 16, 2007). DDR4 (DDR version 4, initial specification published in September 2012 by JEDEC), DDR4E (DDR version 4), LPDDR3 (Low Power DDR version3, JESD209-3B, August 2013 by JEDEC), LPDDR4) LPDDR version 4, JESD209-4, originally published by JEDEC in August 2014), WIO2 (Wide Input/output version 2, JESD229-2 originally published by JEDEC in August 2014, HBM (High Bandwidth Memory, JESD325, originally published by JEDEC in October 2013, LPDDR5 (currently in discussion by JEDEC), HBM2 (HBM version 2), currently in discussion by JEDEC, or others or combinations of memory technologies, and technologies based on derivatives or extensions of such specifications.

A non-volatile memory (NVM) device is a memory whose state is determinate even if power is interrupted to the device. In one embodiment, the NVM device can comprise a block addressable memory device, such as NAND technologies, or more specifically, multi-threshold level NAND flash memory (for example, Single-Level Cell ("SLC"), Multi-Level Cell ("MLC"), Quad-Level Cell ("QLC"), Tri-Level Cell ("TLC"), or some other NAND). A NVM device can also comprise a byte-addressable write-in-place three dimensional cross point memory device, or other byte addressable write-in-place NVM device (also referred to as persistent memory), such as single or multi-level Phase Change Memory (PCM) or phase change memory with a switch (PCMS), Intel® Optane™ memory, NVM devices that use chalcogenide phase change material (for example, chalcogenide glass), resistive memory including metal oxide base, oxygen vacancy base and Conductive Bridge Random Access Memory (CB-RAM), nanowire memory, ferroelectric random access memory (FeRAM, FRAM), magneto resistive random access memory (MRAM) that incorporates memristor technology, spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of one or more of the above, or other memory.

A power source (not depicted) provides power to the components of system 700. More specifically, power source typically interfaces to one or multiple power supplies in system 700 to provide power to the components of system 700. In one example, the power supply includes an AC to DC (alternating current to direct current) adapter to plug into a wall outlet. Such AC power can be renewable energy (e.g., solar power) power source. In one example, power source includes a DC power source, such as an external AC to DC converter. In one example, power source or power supply includes wireless charging hardware to charge via proximity to a charging field. In one example, power source can include an internal battery, alternating current supply, motion-based power supply, solar power supply, or fuel cell source.

In an example, system 700 can be implemented using interconnected compute sleds of processors, memories, storages, network interfaces, and other components. High speed interconnects can be used such as: Ethernet (IEEE 802.3), remote direct memory access (RDMA), InfiniBand, Internet Wide Area RDMA Protocol (iWARP), Transmission Control Protocol (TCP), User Datagram Protocol (UDP), quick UDP Internet Connections (QUIC), RDMA over Converged Ethernet (RoCE), Peripheral Component Interconnect express (PCIe), Intel QuickPath Interconnect (QPI), Intel Ultra Path Interconnect (UPI), Intel On-Chip System Fabric (IOSF), Omni-Path, Compute Express Link (CXL), HyperTransport, high-speed fabric, NVLink, Advanced Microcontroller Bus Architecture (AMBA) interconnect, OpenCAPI, Gen-Z, Infinity Fabric (IF), Cache Coherent Interconnect for Accelerators (CCIX), 3GPP Long Term Evolution (LTE) (4G), 3GPP 5G, and variations thereof. Data can be copied or stored to virtualized storage nodes or accessed using a protocol such as NVMe over Fabrics (NVMe-oF) or NVMe.

Embodiments herein may be implemented in various types of computing, smart phones, tablets, personal computers, and networking equipment, such as switches, routers, racks, and blade servers such as those employed in a data center and/or server farm environment. The servers used in data centers and server farms comprise arrayed server configurations such as rack-based servers or blade servers. These servers are interconnected in communication via various network provisions, such as partitioning sets of servers into Local Area Networks (LANs) with appropriate switching and routing facilities between the LANs to form a private Intranet. For example, cloud hosting facilities may typically employ large data centers with a multitude of servers. A blade comprises a separate computing platform that is configured to perform server-type functions, that is, a "server on a card." Accordingly, each blade includes components common to conventional servers, including a main printed circuit board (main board) providing internal wiring (e.g., buses) for coupling appropriate integrated circuits (ICs) and other components mounted to the board.

In some examples, network interface and other embodiments described herein can be used in connection with a base station (e.g., 3G, 4G, 5G and so forth), macro base station (e.g., 5G networks), picostation (e.g., an IEEE 802.11 compatible access point), nanostation (e.g., for Point-to-MultiPoint (PtMP) applications), on-premises data centers, off-premises data centers, edge network elements, fog network elements, and/or hybrid data centers (e.g., data center that use virtualization, cloud and software-defined networking to deliver application workloads across physical data centers and distributed multi-cloud environments).

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, APIs, instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation. A processor can be one or more combination of a hardware state machine, digital control logic, central processing unit, or any hardware, firmware and/or software elements.

Some examples may be implemented using or as an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

The appearances of the phrase "one example" or "an example" are not necessarily all referring to the same example or embodiment. Any aspect described herein can be combined with any other aspect or similar aspect described herein, regardless of whether the aspects are described with respect to the same figure or element. Division, omission or inclusion of block functions depicted in the accompanying figures does not infer that the hardware components, circuits, software and/or elements for implementing these functions would necessarily be divided, omitted, or included in embodiments.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The terms "first," "second," and the like, herein do not denote any order, quantity, or importance, but rather are used to distinguish one element from another. The terms "a" and "an" herein do not denote a limitation of quantity, but rather denote the presence of at least one of the referenced items. The term "asserted" used herein with reference to a signal denote a state of the signal, in which the signal is active, and which can be achieved by applying any logic level either logic 0 or logic 1 to the signal. The terms "follow" or "after" can refer to immediately following or following after some other event or events. Other sequences of operations may also be performed according to alternative embodiments. Furthermore, additional operations may be added or removed depending on the particular applications. Any combination of changes can be used and one of ordinary skill in the art with the benefit of this disclosure would understand the many variations, modifications, and alternative embodiments thereof.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z."

Illustrative examples of the devices, systems, and methods disclosed herein are provided below. An embodiment of the devices, systems, and methods may include any one or more, and any combination of, the examples described below.

Example 1 includes one or more examples and includes a method comprising: a network interface device providing a prior hop network interface device with congestion control information per-flow to cause a reduced transmission rate of the flow from the prior hop network interface.

Example 2 includes one or more examples, wherein the prior hop network interface device comprises an immediate upstream network interface device.

Example 3 includes one or more examples, wherein the congestion control information per-flow comprises a request to reduce transmission rate of packets from a particular queue, wherein the particular queue is a source queue of packets of the flow.

Example 4 includes one or more examples, wherein the particular queue is identified in a congestion causing packet by the prior hop network interface device.

Example 5 includes one or more examples, wherein the congestion control information per-flow comprises an identifier of a queue in a received packet header field.

Example 6 includes one or more examples, wherein the prior hop network interface device comprises a data plane to be configured to pause or resume transmission from a queue independent from informing a control plane or central processing unit.

Example 7 includes one or more examples, wherein the congestion control information per-flow comprises a request to resume sending packets from a particular queue after a reducing a transmit rate of packets from the particular queue.

Example 8 includes one or more examples and includes tracking a number of packets that exceed a threshold in an identified congested queue in order to determine when to request to resume sending packets from a particular queue.

Example 9 includes one or more examples and includes an apparatus comprising: a network interface device comprising: data plane circuitry, when operational, to: identify a flow of packets that is a cause of queue congestion and cause transmission, to an upstream network interface device, of a packet with an identifier of a source queue in the upstream network interface device that requests reduction of transmission of packets from the source queue associated with the upstream network interface device.

Example 10 includes one or more examples, wherein source queue is identified in a congestion causing packet by the upstream network interface device and wherein the upstream network interface device comprises a prior hop network interface device.

Example 11 includes one or more examples, wherein the identifier of a source queue in the upstream network interface device is received in a header field of the packet.

Example 12 includes one or more examples, wherein the upstream network interface device comprises a data plane to be configured to pause or resume transmission from a queue independent from informing a control plane or central processing unit.

Example 13 includes one or more examples, wherein the data plane circuitry, when operational, is to: track a number of packets that exceed a threshold in an identified congested queue in order to determine when to request to resume sending packets from a particular queue and request to resume sending packets from the identified congested queue based on the number of packets that exceed a threshold being zero.

Example 14 includes one or more examples, wherein the network interface device comprises one or more of: a network interface controller (NIC), a remote direct memory access (RDMA)-enabled NIC, SmartNIC, router, switch, forwarding element, infrastructure processing unit (IPU), data processing unit (DPU).

Example 15 includes one or more examples, and includes a server communicatively coupled to the network interface device to configure operation of the data plane circuitry.

Example 16 includes one or more examples, and includes a data center comprising the upstream network interface device and the network interface device to provide per-hop congestion control.

Example 17 includes one or more examples, and includes at least one computer-readable medium comprising instructions stored thereon, that if executed, cause one or more processors to: configure a data plane circuitry to: identify a flow of packets that is a cause of queue congestion and cause transmission, to an upstream network interface device, of a packet with an identifier of a source queue in the upstream network interface device that requests reduction of transmission of packets from the source queue associated with the upstream network interface device.

Example 18 includes one or more examples, wherein the identifier of a source queue in the upstream network interface device is received in a header field of the packet.

Example 19 includes one or more examples, wherein the upstream network interface device comprises a data plane to be configured to pause or resume transmission from a queue independent from informing a control plane or central processing unit.

Example 20 includes one or more examples, wherein the source queue stores only packets associated with the identified flow.

What is claimed is:

1. A method comprising:
a network interface device performing per-hop congestion control by:
based on detection of congestion associated with a flow in the network interface device, providing a second network interface device with congestion control information associated with the flow to cause a reduced transmission rate of packets of the flow from the second network interface device to the network interface device and
the second network interface device performing per-hop congestion control by:
based on detection of congestion associated with the flow in the second network interface device, providing a third network interface device with second congestion control information associated with the flow to cause a reduced transmission rate of packets of the flow by the third network interface device to the second network interface device, wherein:
the third network interface device comprises an intermediate switch that is to receive packets from a sender of packets of the flow,
the congestion control information associated with the flow comprises an identifier of a particular queue and a request to reduce transmission rate of packets from the particular queue, and
the particular queue comprises a source queue of packets of the flow.

2. The method of claim 1, wherein the second network interface device is coupled to the network interface device as an immediately upstream network interface device and the third network interface device is coupled to the second network interface device as an immediately upstream network interface device.

3. The method of claim 1, wherein the particular queue is identified in a congestion causing packet by the second network interface device.

4. The method of claim 1, wherein the congestion control information associated with the flow comprises an identifier of a queue in a packet header field.

5. The method of claim 1, wherein the second network interface device comprises a data plane to be configured to pause or resume transmission from a queue independent from informing a control plane or central processing unit.

6. The method of claim 1, wherein the congestion control information associated with the flow comprises a request to resume sending packets from a particular queue after a reducing a transmit rate of packets from the particular queue.

7. The method of claim 6, comprising:
tracking a number of packets in an identified congested queue to determine when to request to resume sending packets from a particular queue.

8. An apparatus comprising:
a network interface device comprising:
data plane circuitry, when operational, to:
identify a flow of packets that is a cause of queue congestion and
perform per-hop flow control by cause of transmission, solely to a second network interface device, of a packet with an identifier of a source queue in the second network interface device that requests reduction of transmission of packets from the source queue associated with the second network interface device, wherein the second network interface device comprises an intermediate switch that is to receive packets from a sender of packets of the flow.

9. The apparatus of claim 8, wherein the source queue is identified in a congestion causing packet by the second network interface device and wherein the second network interface device is coupled to the network interface device as an immediately upstream network interface device.

10. The apparatus of claim 8, wherein the identifier of a source queue in the second network interface device is in a header field of the packet.

11. The apparatus of claim 8, wherein the second network interface device comprises a data plane to be configured to pause or resume transmission from a queue independent from informing a control plane or central processing unit.

12. The apparatus of claim 8, wherein the data plane circuitry, when operational, is to:
track a number of packets in an identified congested queue in order to determine when to request to resume sending packets from a particular queue and
request to resume sending packets from the identified congested queue based on the number of packets.

13. The apparatus of claim 8, wherein the network interface device comprises one or more of: a network interface controller (NIC), a remote direct memory access (RDMA)-enabled NIC, SmartNIC, router, switch, forwarding element, infrastructure processing unit (IPU), data processing unit (DPU).

14. The apparatus of claim 8, comprising a server communicatively coupled to the network interface device to configure operation of the data plane circuitry.

15. The apparatus of claim 8, comprising a data center comprising the second network interface device and the network interface device to provide per-hop congestion control.

16. At least one non-transitory computer-readable medium comprising instructions stored thereon, that if executed, cause one or more processors to:
configure a data plane circuitry to:
identify a flow of packets that is a cause of queue congestion and
perform per-hop flow control by cause of transmission, solely to a second network interface device, of a packet with an identifier of a source queue in the second network interface device that requests reduction of transmission of packets from the source queue associated with the second network interface device, wherein the second network interface device comprises an intermediate switch that is to receive packets from a sender of packets of the flow.

17. The at least one computer-readable medium of claim 16, wherein the identifier of a source queue in the second network interface device is in a header field of the packet.

18. The at least one computer-readable medium of claim 16, wherein the second network interface device comprises a data plane to be configured to pause or resume transmission from a queue independent from informing a control plane or central processing unit.

19. The at least one computer-readable medium of claim 16, wherein the source queue stores only packets associated with the identified flow.

20. The method of claim 1, comprising:
the network interface device performing per-hop and per-flow congestion control and
the second network interface device performing per-hop and per-flow congestion control.

* * * * *